US011691328B2

(12) United States Patent
Furlotti

(10) Patent No.: US 11,691,328 B2
(45) Date of Patent: Jul. 4, 2023

(54) STATION FOR THERMOFORMING THERMOPLASTIC SHEET-LIKE BLANKS FOR THERMOFORMING LINES AND A CORRESPONDING METHOD

(71) Applicant: I.M.A. INDUSTRIA MACCHINE AUTOMATICHE S.P.A IN SIGLA IMA S.P.A., Ozzano dell'Emilia (IT)

(72) Inventor: Filippo Furlotti, Traversetolo (IT)

(73) Assignee: I.M.A. INDUSTRIA MACCHINE AUTOMATICHE S.P.A IN SIGLA IMA S.P.A., Ozzano dell'Emilia (IT)

( * ) Notice: Subject to any disclaimer, the term of this patent is extended or adjusted under 35 U.S.C. 154(b) by 666 days.

(21) Appl. No.: 16/482,085

(22) PCT Filed: Feb. 8, 2018

(86) PCT No.: PCT/EP2018/053215
§ 371 (c)(1),
(2) Date: Jul. 30, 2019

(87) PCT Pub. No.: WO2018/146217
PCT Pub. Date: Aug. 16, 2018

(65) Prior Publication Data
US 2020/0247033 A1 Aug. 6, 2020

(30) Foreign Application Priority Data

Feb. 10, 2017 (IT) .................. 102017000014650

(51) Int. Cl.
*B29C 51/22* (2006.01)
*B29C 51/08* (2006.01)
(Continued)

(52) U.S. Cl.
CPC ............ *B29C 51/22* (2013.01); *B29C 51/082* (2013.01); *B29C 51/262* (2013.01); *B29C 51/30* (2013.01); *B29L 2031/712* (2013.01)

(58) Field of Classification Search
CPC ..... B29C 51/22; B29C 51/082; B29C 51/262; B29C 51/30; B29C 51/421; B29C 51/422;
(Continued)

(56) References Cited

U.S. PATENT DOCUMENTS 2,953,814 A * 9/1960 Mumford ................ B29C 51/22
264/153
3,895,931 A * 7/1975 Hamilton ................ C03B 11/12
65/304

(Continued)

FOREIGN PATENT DOCUMENTS

CN 102639313 A 8/2012
CN 102666046 A 9/2012
(Continued)

OTHER PUBLICATIONS

International Search Report dated Mar. 8, 2018 re: Application No. PCT/EP2018/053215, pp. 1-3, citing: EP 1 404 505 A1, U.S. Pat. No. 4,208,955 A and US 2011/0204547 A1.

(Continued)

*Primary Examiner* — Jacob T Minskey
*Assistant Examiner* — Caroline Beha
(74) *Attorney, Agent, or Firm* — Cantor Colburn LLP

(57) ABSTRACT

A station for feeding closing seals for containers, which includes at least one fixed magazine of seals which is provided with an outlet from which the seals can be taken individually. The station includes a carousel for feeding seals which can rotate with respect to a first central rotation axis and is provided with pickers which are radially spaced apart from the first rotation axis. The pickers are individually (Continued)

rotatable about a second rotation axis which is not parallel to the first axis of the carousel. During the rotation of the carousel, at least one picker can is configured to rotate about the second axis from a position for taking the seal from the magazine to a position for releasing the seal.

9 Claims, 10 Drawing Sheets

(51) Int. Cl.
 B29C 51/26 (2006.01)
 B29C 51/30 (2006.01)
 B29L 31/00 (2006.01)
(58) Field of Classification Search
 CPC ....... B29C 51/425; B29C 51/04; B29C 49/06; B29C 49/36; B29C 49/4205; B29C 49/56; B29L 2031/712; B29L 2031/7132
 See application file for complete search history.

(56) References Cited

U.S. PATENT DOCUMENTS

| | | | |
|---|---|---|---|
| 3,964,237 A | 6/1976 | Johansen | |
| 3,970,419 A * | 7/1976 | Valyi | B29C 49/18 264/516 |
| 3,986,807 A * | 10/1976 | Takegami | B29C 49/36 425/537 |
| 4,208,955 A * | 6/1980 | Doll | B31B 50/00 493/102 |
| 4,233,010 A * | 11/1980 | Suzuki | B29C 49/36 425/534 |
| 4,816,110 A | 3/1989 | Foldesi et al. | |
| 6,094,890 A | 8/2000 | Michellon et al. | |
| 2003/0001318 A1 | 1/2003 | Van Manen | |
| 2004/0131719 A1* | 7/2004 | Bottacco | B29C 45/6728 425/409 |
| 2006/0099294 A1* | 5/2006 | Netsu | B29C 49/421 425/540 |
| 2008/0286083 A1* | 11/2008 | Furlotti | B65G 47/847 414/815 |
| 2011/0074057 A1* | 3/2011 | Lee | B29C 51/22 198/803.14 |
| 2011/0204547 A1 | 8/2011 | Lofgren | |
| 2016/0339623 A1* | 11/2016 | Lemaire | B29C 49/4823 |

FOREIGN PATENT DOCUMENTS

| | | |
|---|---|---|
| CN | 104369925 A | 2/2015 |
| EP | 1404505 A1 | 4/2004 |
| WO | 02098630 A1 | 12/2002 |

OTHER PUBLICATIONS

IT Search Report dated Nov. 13, 2017 re: Application No. IT 2017000014650, pp. 1-8, citing: EP 1 404 505 A1, U.S. Pat. No. 4,208,955 A and US 2011/0204547 A1.

Written Opinion dated Mar. 8, 2018 re: Application No. PCT/EP2018/053215, pp. 1-6, citing: EP 1 404 505 A1, U.S. Pat. No. 4,208,955 A and US 2011/0204547 A1.

* cited by examiner

STATION FOR THERMOFORMING THERMOPLASTIC SHEET-LIKE BLANKS FOR THERMOFORMING LINES AND A CORRESPONDING METHOD

TECHNICAL FIELD

The present disclosure relates to a station for thermoforming thermoplastic sheet-like blanks, particularly for continuous FFS (form-fill-seal) packaging lines.

BACKGROUND

Conventional solutions are based on linear machines, such as for example the one described in U.S. Pat. No. 6,094,890. These solutions however have a series of limitations that are associated precisely with deployment in a production line. One of these limitations, for example, is an extremely low flexibility owing to the fact that the machine spacing is linked to the diameter of the containers, so that, when it becomes necessary to modify the latter, the machine has to be subjected to extensive modifications, which affect especially the overall length of the machine, with the consequence that a machine designed to work on containers that have a certain diameter cannot work on containers with a larger diameter, except at the expense of adaptations that are entirely uneconomical or incompatible with the space originally allocated to the machine.

It is known from U.S. Pat. No. 3,964,237 to provide a packaging line in which, in order to obtain thermoformed containers, thermoplastic sheet-like blanks are used, in particular disks, which are individually heated, thermoformed, filled and closed.

The advantage of the solution known from U.S. Pat. No. 3,964,237 is that, differently from other conventional solutions which entail molding a plurality of containers on a sheet of thermoplastic material fed by a spool, the volume occupied by such spool is considerably greater than that occupied by the sheet-like blanks of U.S. Pat. No. 3,964,237 in order to obtain the same number of containers.

A drawback of the solution known from U.S. Pat. No. 3,964,237 is that it operates at low speeds. In particular, the thermoforming station of U.S. Pat. No. 3,964,237 operates intermittently, to move first the disks and then the containers to various fixed stations of the machine, which require the disk or the container to be stationary while the associated operation is carried out by each station.

EP 1404505 discloses to arrange clam shell molds on a rotating frame, which directly receive thermoplastic material from a sheet extruder and in which the die halves are hinged to each other.

U.S. Pat. No. 4,208,955 discloses a container manufacturing apparatus in which tubular blanks are moved through an endless conveyor and are delivered to a bottom forming station turret having forming heads rotatably mounted thereon.

SUMMARY

The aim of the present disclosure is to provide a thermoforming station for lines for thermoforming thermoplastic sheet-like blanks from which to obtain respective containers, which is capable of improving the prior art in one or more of the above mentioned aspects.

Within this aim, the disclosure provides a way to thermoform sheet-like blanks with a greater speed than conventional solutions.

The disclosure enables the continuous thermoforming of thermoplastic sheet-like blanks, in particular by facilitating the gripping of blanks coming in and the release of thermoformed containers going out.

The disclosure facilitates the manipulation of the blanks after the thermoforming.

The disclosure provides a thermoforming station and a corresponding method that can be used in an FFS (form-fill-seal) packaging line.

Furthermore, the present disclosure overcomes the drawbacks of the prior art in a different manner to any existing solutions.

Still further, the disclosure provides a thermoforming station that is highly reliable, easy to implement and low cost.

This aim and these and other advantages which will become better apparent hereinafter are achieved by providing a station for thermoforming thermoplastic sheet-like blanks for a thermoforming line, characterized in that it comprises a thermoforming carousel which can rotate continuously about a central axis and which comprises a plurality of thermoforming heads which are radially spaced apart from said central axis, each thermoforming head being adapted to receive at least one respective heated thermoplastic sheet-like blank at a first peripheral region which is outside the carousel, so as to deform said at least one blank during the rotation of the carousel in order to generate a container and release said at least one blank to a second peripheral region which is outside the carousel and is angularly spaced apart from the first region.

The aim and advantages of the disclosure are likewise achieved by providing a method of continuously thermoforming thermoplastic sheet-like blanks for forming containers, wherein the method includes the following steps:

continuously rotating a carousel about a central axis, said carousel having a plurality of thermoforming heads which are radially spaced apart from said central axis;

at a first peripheral region which is outside said carousel, feeding heated thermoplastic sheet-like blanks to said thermoforming heads, so that each thermoforming head that passes through said first region receives a respective heated sheet-like blank;

during said rotation, holding said blanks in the respective thermoforming heads and plastically deforming said blanks until they are brought to the shape of a container;

releasing said containers to a second region around the carousel, which is angularly spaced apart from the first region with respect to said central axis.

BRIEF DESCRIPTION OF THE DRAWINGS

Further characteristics and advantages of the disclosure will become better apparent from the detailed description that follows of a preferred, but not exclusive, embodiment of the thermoforming station according to the disclosure, which is illustrated for the purposes of non-limiting example in the accompanying drawings wherein.

DETAILED DESCRIPTION OF THE DRAWINGS

Figure 1:
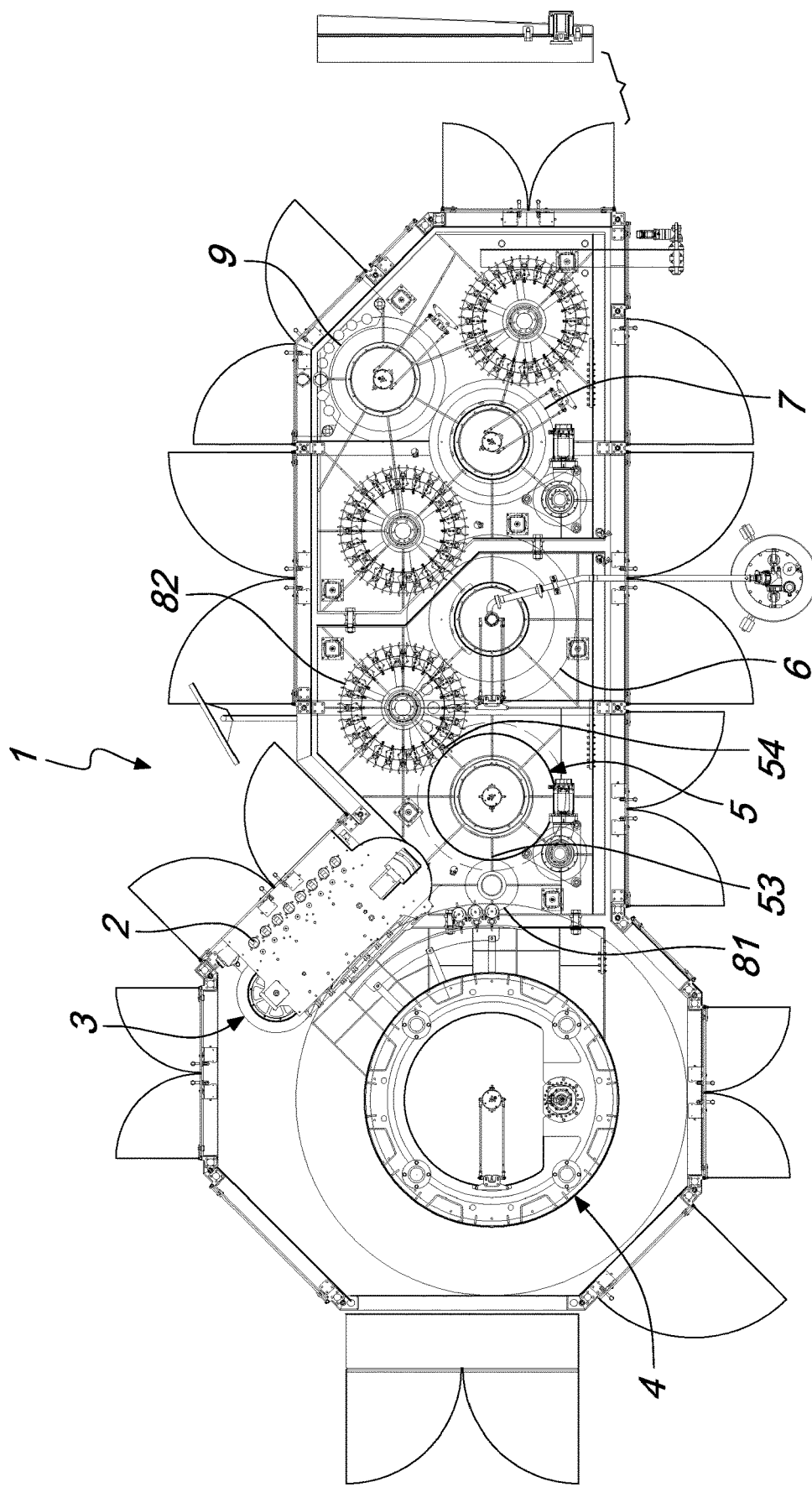
FIG. 1 is a plan view of an FFS (form-fill-seal) packaging line that uses the thermoforming station according to the disclosure.
Figure 2:
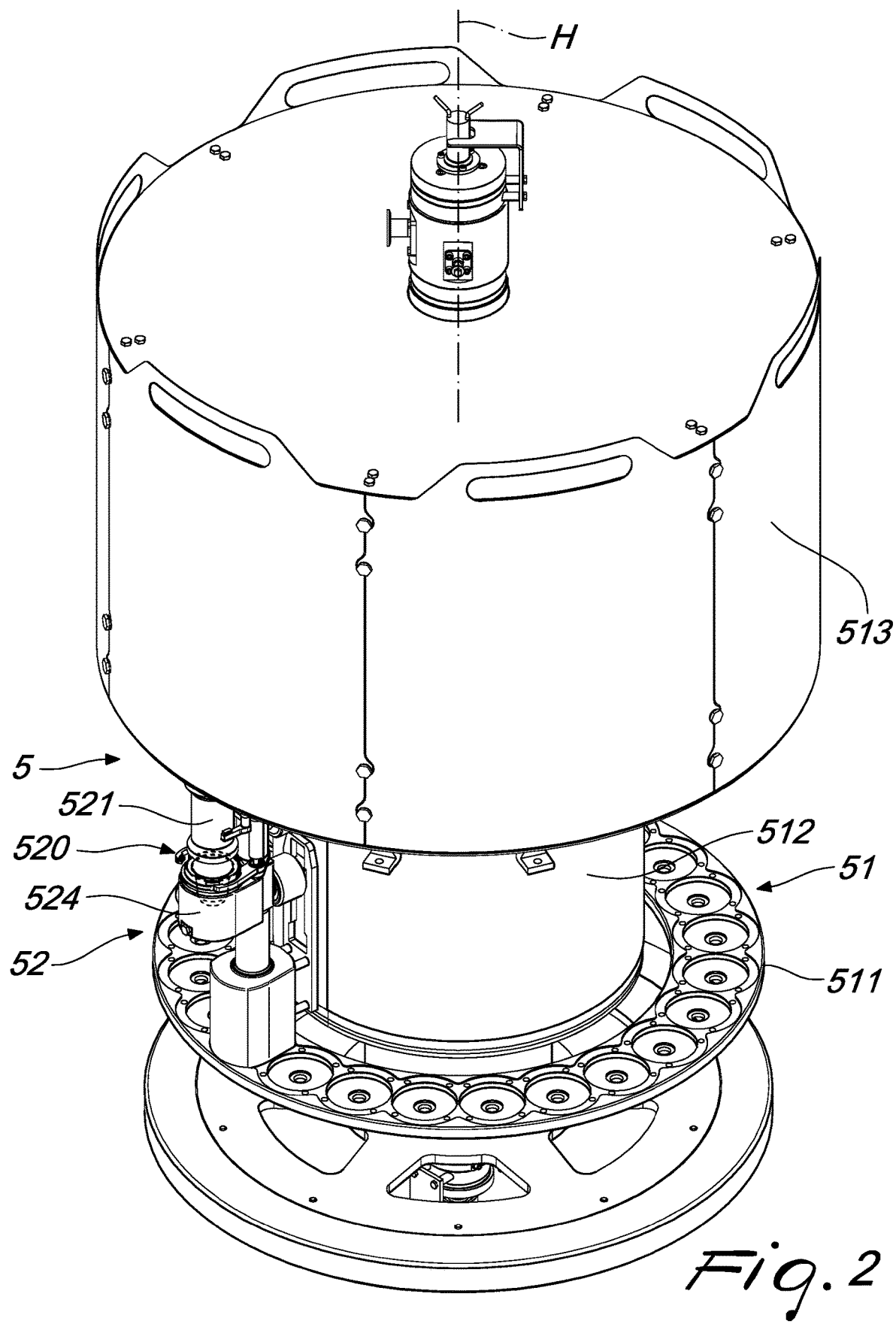
FIG. 2 is a perspective view of the thermoforming carousel used in the line in FIG. 1.
Figure 3:
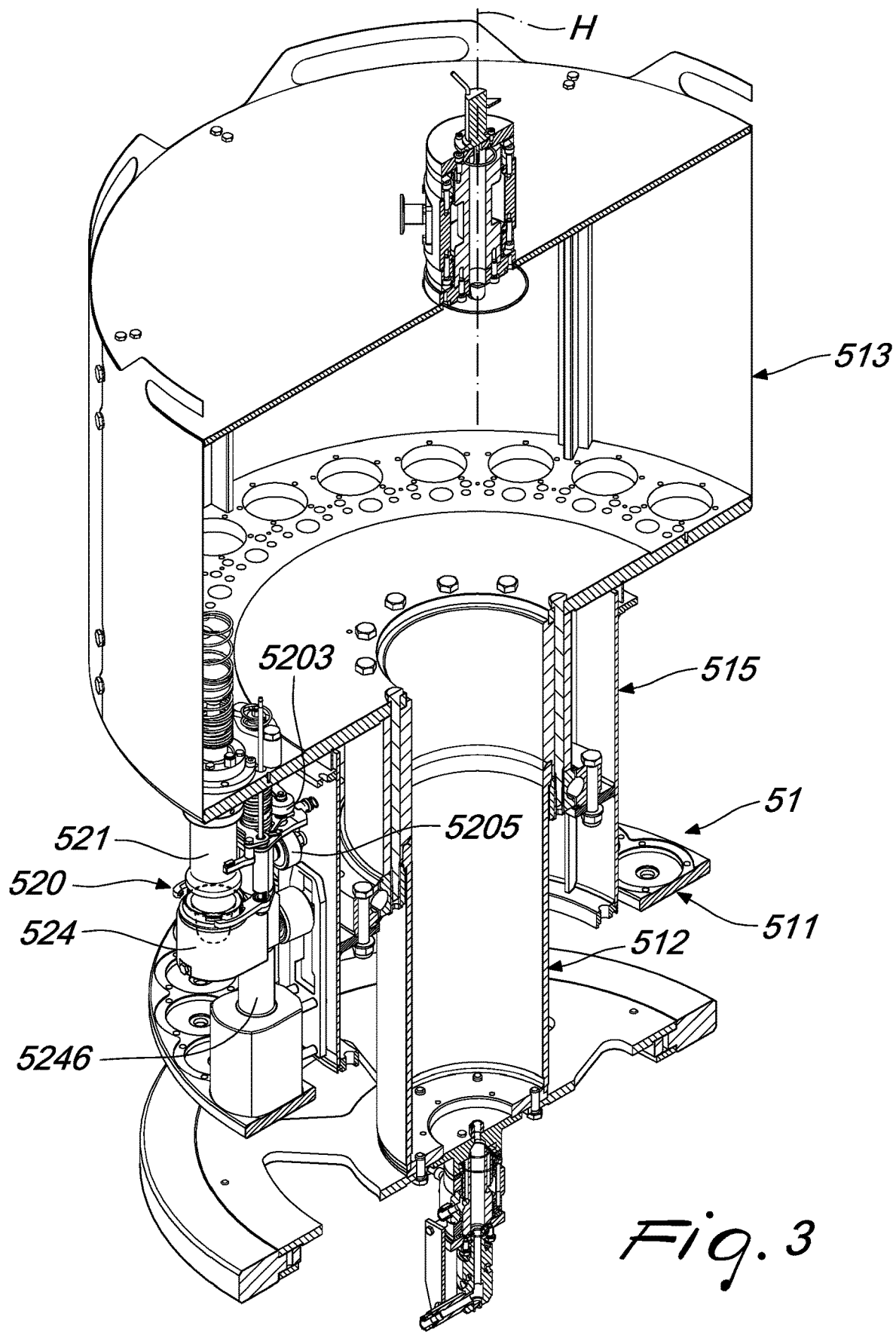
FIG. 3 is an axial cross-sectional perspective view of the carousel in FIG. 2.

With reference to FIGS. 1-10, a line for packaging containers fillable with loose material using thermoforming, generally designated by the reference numeral 1, comprises a magazine 2 of thermoplastic sheet-like blanks G, a station 3 for feeding the blanks to a subsequent station 4 for heating the blanks, a station 5 for thermoforming containers starting from such blanks, a station 6 for filling the containers with the loose material, and a station 7 for sealing the filled containers by way of seals supplied by a station for feeding seals 9.

The thermoplastic sheet-like blanks G comprise, or are entirely constituted by, a "token" of thermoformable plastic material, for example a thermoplastic polymer, preferably of the type suitable for foods, such as PS, HIPS, PET or the like. Generally, each blank G can have any shape in plan view, for example round, square, rectangular, oval, polygonal, that corresponds to the plan of the final container that it is desired to provide or of the rim of its mouth. In the preferred and illustrated embodiment, each blank G is adapted to the formation of a single container and has, but is not limited to, a disk-like shape.

Preferably, the containers C obtained with the thermoforming station 5 are tubs, adapted for example to be filled in the filling station 6 with an edible substance in the form of a particulate or a fluid, for example with yogurt, in order to be then sealed with "peelable" sheet covers (for example plastic/aluminum laminates).

The thermoforming station 5 comprises a thermoforming carousel 51 which can rotate continuously about a central axis H and which has a plurality of thermoforming heads 52 that are radially spaced apart from the central axis H. Only one of such thermoforming heads 52 is shown in the drawings for the sake of simplicity.

Each thermoforming head 52 is adapted to:

receive at a first, input peripheral region 53, outside the carousel, at least one respective thermoplastic sheet-like blank G, conveniently preheated;

retain the respective blank G during rotation of the thermoforming carousel 51 while it imparts a deformation in order to make it assume a desired container C shape; and release the container C thus obtained to a second, output peripheral region 54, which is outside the thermoforming carousel 51 and angularly spaced apart from the first region 53.

In the first peripheral region 53 there can be an input star conveyor 81, while in the second peripheral region 54 there can be an output star conveyor 82.

The thermoforming carousel 51, in particular, can comprise a lower support ring 511 which is integral with an upper chamber 513, which is also fixed to a central hub 512 and can rotate therewith. The thermoforming carousel 51 also comprises a fixed bulkhead 515, with respect to which the ring 511 rotates together with the chamber 513. Cam-shaped guide profiles protrude radially from the bulkhead 515, and will be described later.

The chamber 513 is preferably adapted to accommodate the compressed air devices which will be described below.

Each thermoforming head 52 can comprise a device 520 for gripping the sheet-like blank G, at least for gripping the blank arriving from the first region 53 and for positioning it at a molding region.

Figure 4:
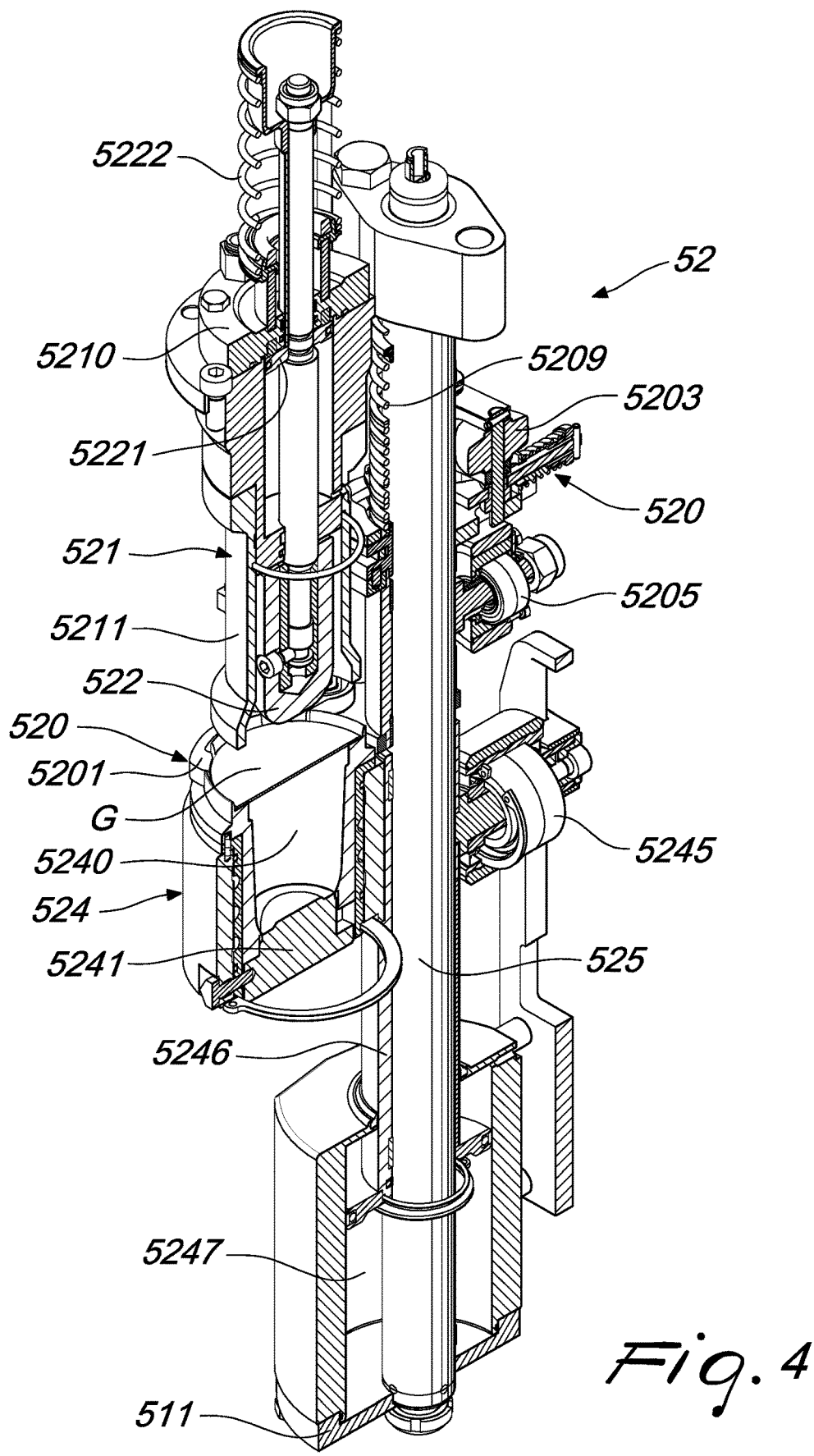
FIGS. 4 to 7 are axial partially cross-sectional perspective views of a thermoforming head of the carousel in FIG. 2, at consecutive moments of processing starting from an initial condition wherein the blank is sheet-like and ending in an end condition wherein the blank has been thermoformed into the form of container, in particular into a tub.
Figure 5:
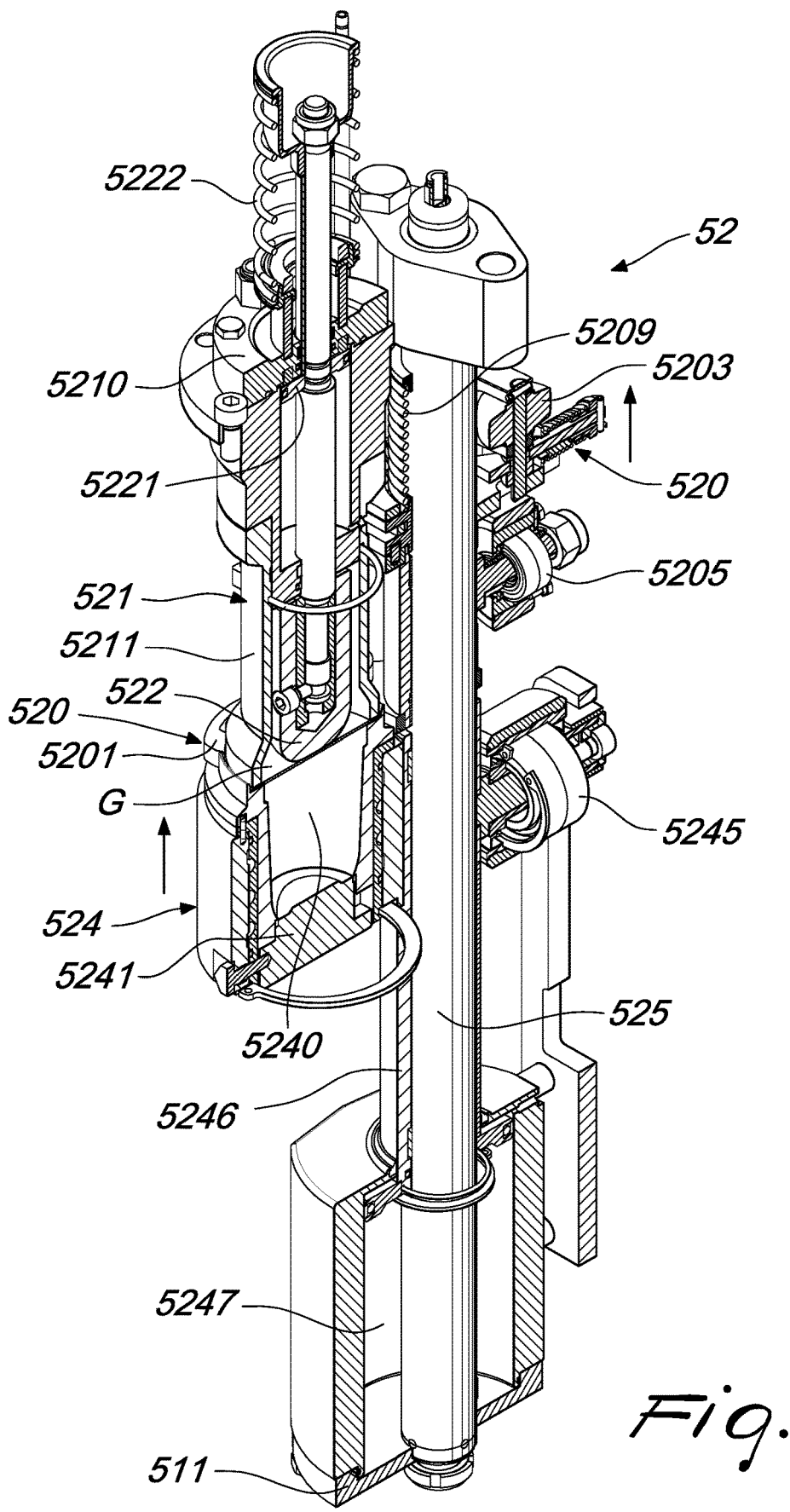
Figure 6:
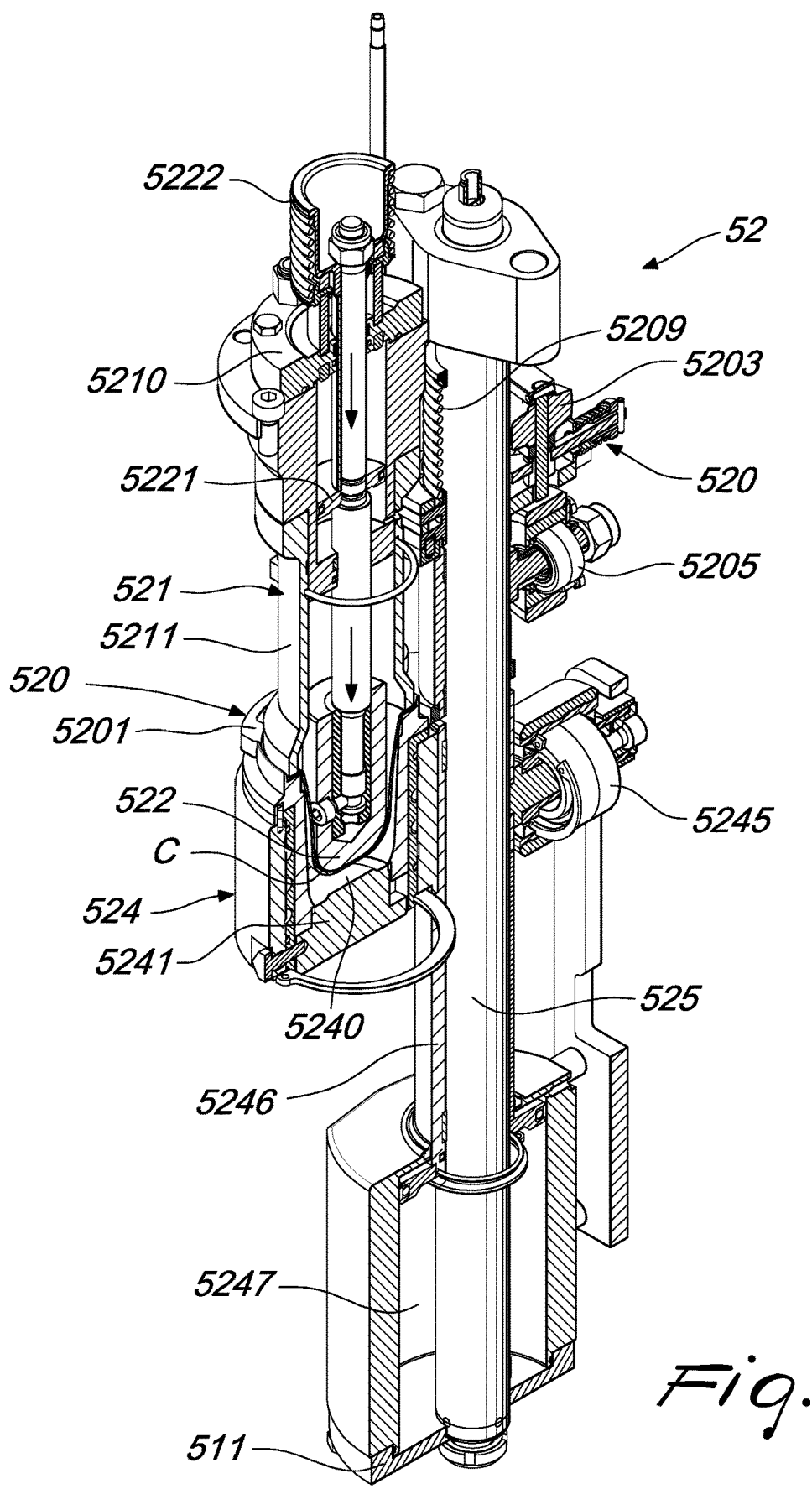
Figure 7:
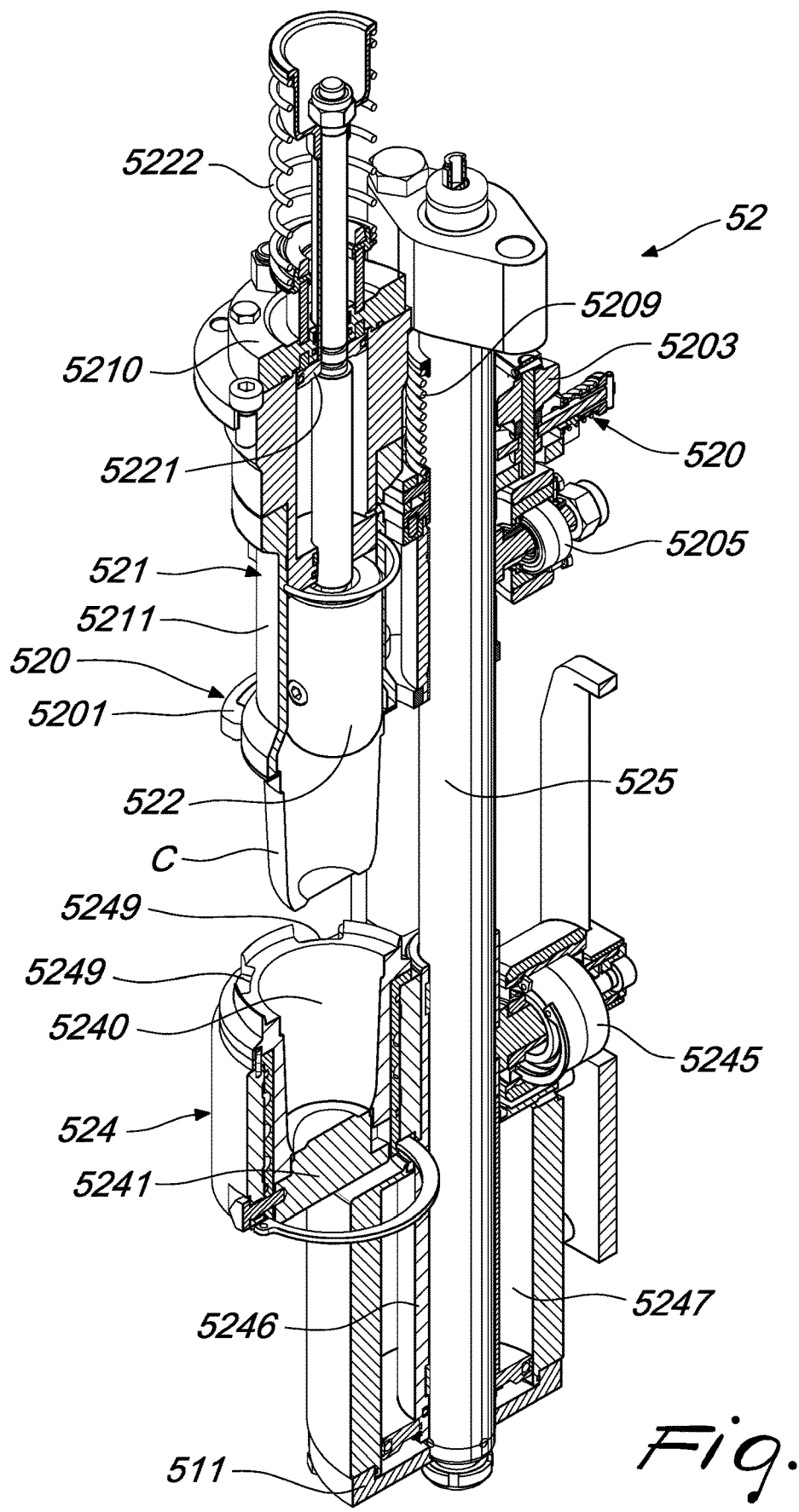

Furthermore, each thermoforming head 52 can comprise:

a bell assembly 521 for thermoforming equipped at least with a thermoforming drawing device 522 and means for actuating the drawing device 522 and with compressed air blow-molding devices; the means for actuating the drawing device 522 are preferably pneumatic and the drawing device 522 together with the compressed air blow-molding devices is adapted to form a container C by way of drawing and subsequent blow-molding of the sheet-like blank G;

a mold 524 to allow the deformation of the sheet-like blank G until it reaches the desired shape of the container C; the mold 524 can be movable at least between a position in which it is arranged close to the bell assembly 521 (as in FIGS. 5 and 6) and a position in which it is arranged away from the bell assembly 521 (as in FIGS. 4 and 7).

Preferably, in the position in which the mold 524 is arranged close to the bell assembly 521, the plastic deformation occurs of the blank G from the sheet-like configuration G to that of a container C, while in the position in which the mold 524 is arranged away from the bell assembly 521 the steps of loading the sheet-like blank G and unloading the container C from the thermoforming station are carried out.

Each thermoforming head 52 is associated with a dedicated upright column 525 on which all or some of its components move and/or are supported. The upright column 525 is fixed on the ring 511 and extends vertically with its axis parallel to the rotation axis H of the thermoforming carousel 51.

Figure 8:
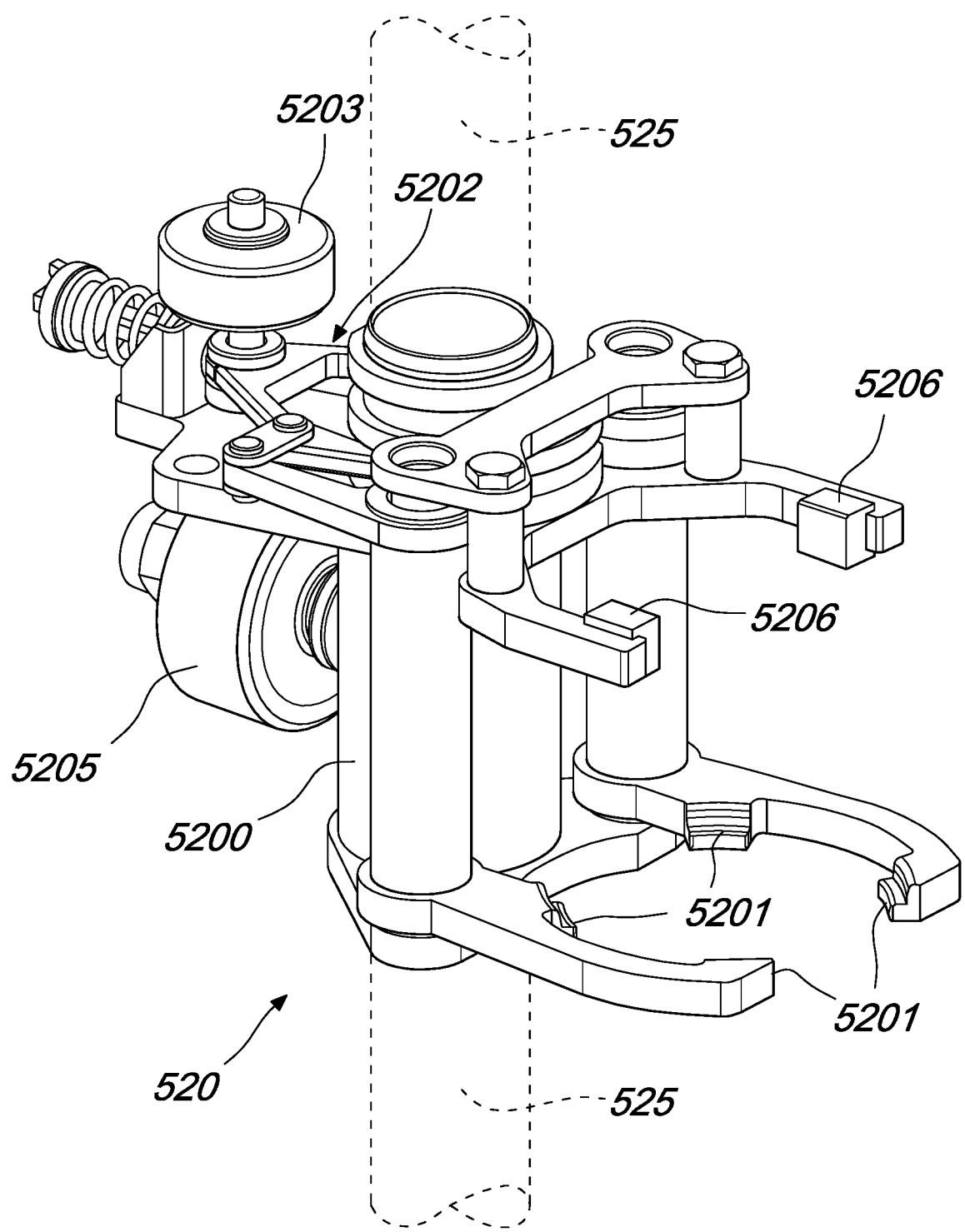
FIG. 8 is a cross-sectional view of a gripping device mounted on the thermoforming head of the carousel in FIG. 2.

Going into more detail about the embodiment shown, with reference now also to FIG. 8, each gripping device 520 can move on the respective column 525 and to this end comprises a guide sleeve 5200 that can slide on the column 525 and a first cam-following roller for movement 5205 which, in the rotary movement of the head 52 on the thermoforming carousel 51, cooperates with a dedicated fixed cam (not shown) which determines the vertical translation along the column 525 of the gripping device 520 as a whole, in order to synchronize it with the movement of the underlying mold 524. The gripping device 520 also comprises a return spring 5209 which is mounted on the column 525 and acts on the device 520 proper, working against the cam-following roller 5205.

To support the blank G along its peripheral region during the positioning and/or during the plastic deformation and when the mold 524 is moved away from the bell assembly 521, the gripping device 520 is advantageously provided with grippers 5201 which are articulated to an actuation mechanism 5202 which in turn is functionally connected with a second cam-following roller 5203 for actuating grippers 5203 which cooperates with a dedicated fixed cam (not shown) so as to determine the opening and closing of the grippers 5201 at reference angular positions during the rotation of the thermoforming head 52 in operation.

The grippers 5201 advantageously comprise at least two mutually opposing push points, more preferably four mutually opposing push points, in order to conveniently support the heated blank G received from the input star conveyor 81 and, at the end of the thermoforming, the container C when the mold 524 is moved away from the bell assembly 521.

Preferably, each gripping device 520 is also provided with anti-rotation elements 5206 that are designed to prevent any rotation movements thereof around the column 525; in the preferred and non-limiting embodiment, such anti-rotation elements 5206 are in the form of arms that are integral with the guide sleeve 5200 and which end in anti-rotation runners which in operation are in contact with the adjacent bell assembly 521.

In operation, the heated blank G that arrives at the thermoforming carousel 51 at the first peripheral region 53 is engaged by the grippers 5201 of the gripping device 520 and is positioned and optionally held in the position in which its thermoforming will take place, and is released by the grippers 5201 at least at the second peripheral region 54, by which time the container C has now been created.

Figure 9:
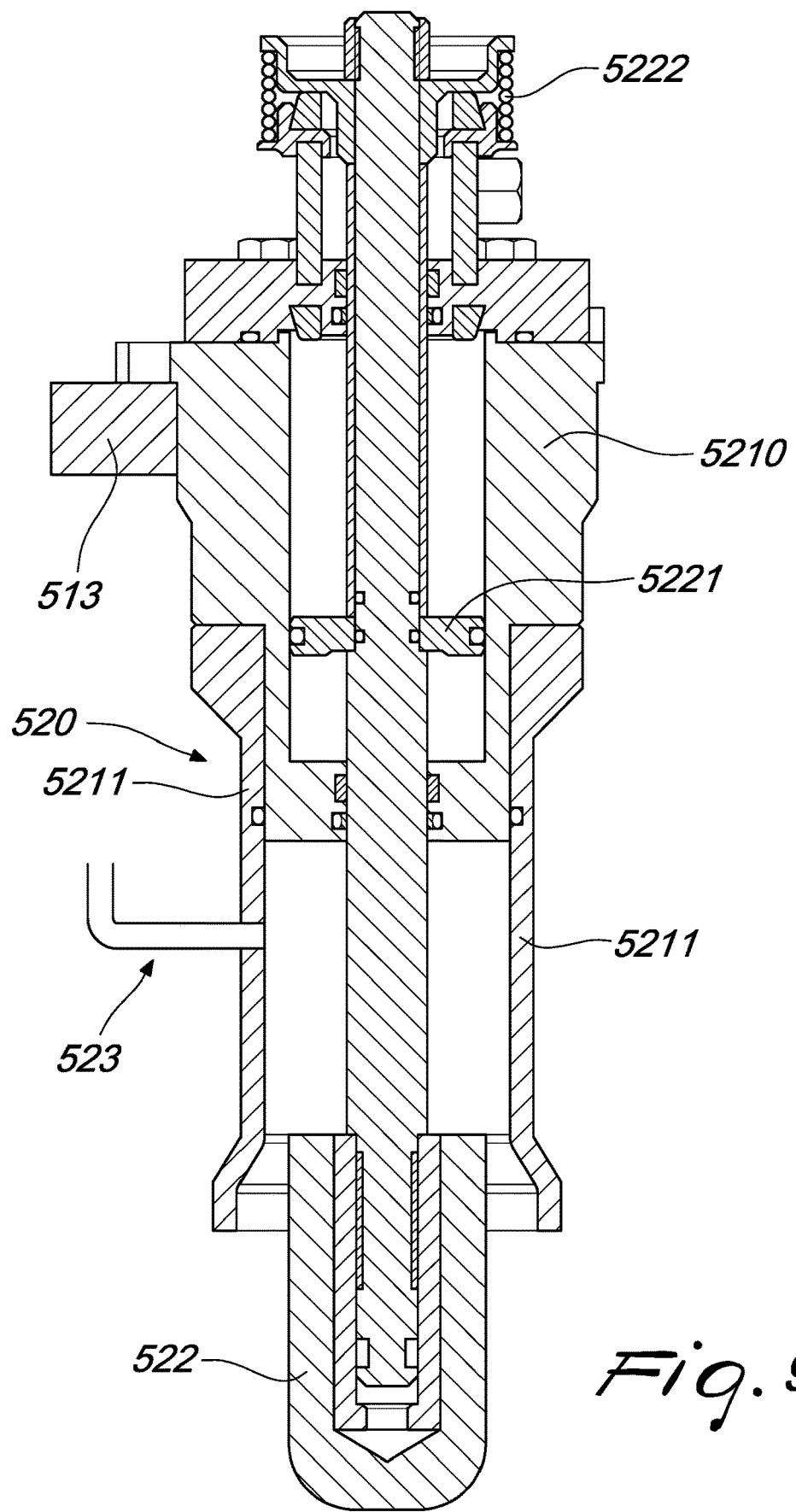
FIG. 9 is a cross-sectional view of a bell thermoforming assembly mounted on the thermoforming head of the carousel in FIG. 2.

Turning now to describe in more detail the preferred embodiment of the bell assembly 521, and with reference to also to FIG. 9, this comprises a flange 5210 for fixing to the upper chamber 513, so that the bell assembly 521 remains fixed with respect to the column 525.

The assembly 521 comprises a bell 5211 within which the drawing device 522 is moved alternately in operation by means for actuating the drawing device 5221.

Preferably such means for actuating the drawing device 5221 are pneumatic and comprise a pneumatic actuator that actuates the stem of the drawing device 522 in the direction of the mold 524 when the thermoforming head reaches a preset angular position in its rotary movement about the axis H.

Working against the means for actuating the drawing device 5221, there is a return spring 5222 which also acts on the stem of the drawing device proper in order to return it to a position away from the mold 524.

Compressed air blow-molding devices are also provided (not shown) which in the preferred embodiment comprise at least one conduit for conveying compressed air 523 which is connected to a source of compressed air that supplies the bell 5211 when the thermoforming head of the drawing device 522 has drawn the blank G.

Operation of the bell assembly 521 will be described in more detail after describing the cooperating mold 524.

Figure 10:
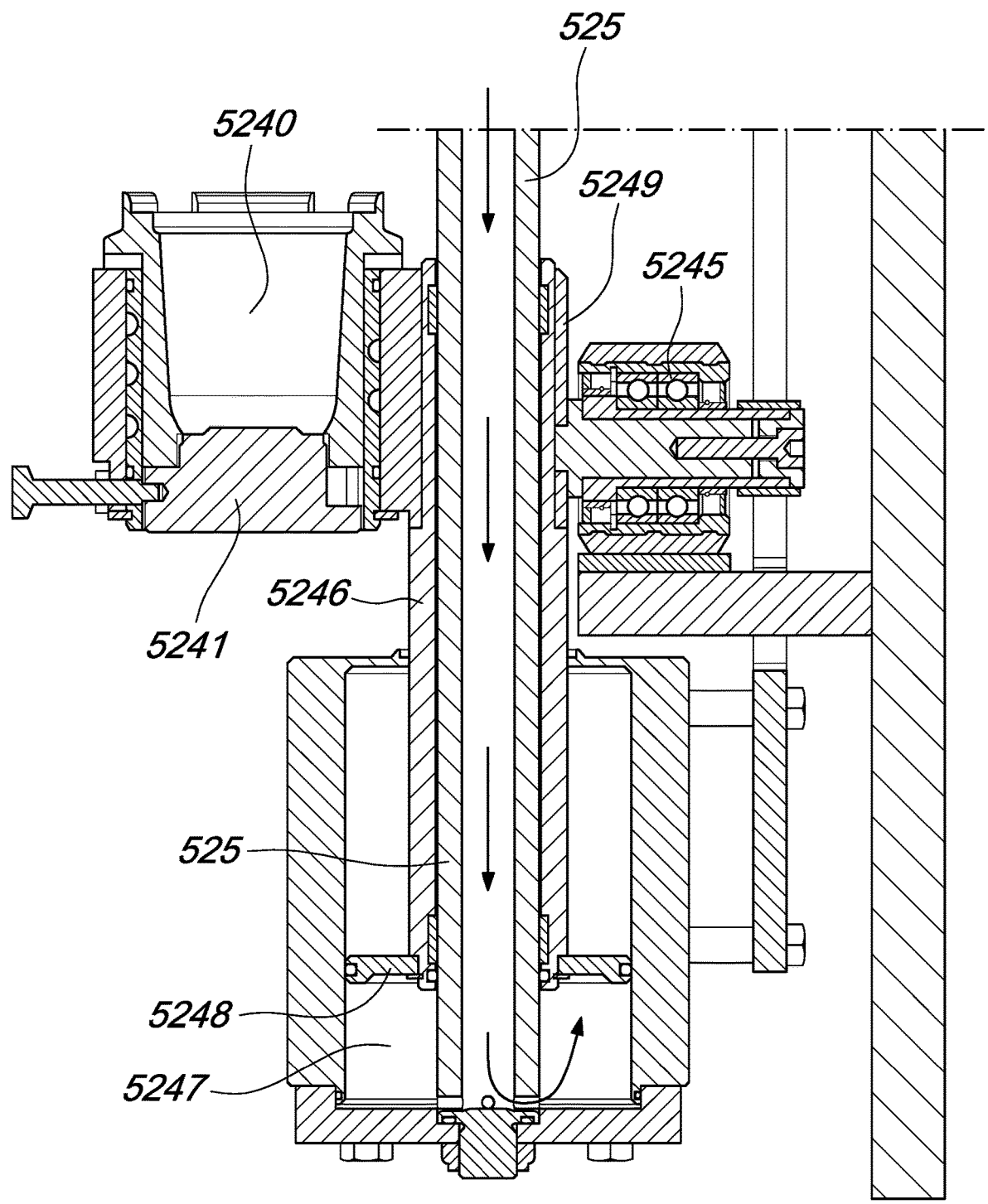
FIG. 10 is a cross-sectional view of the pneumatic tightening device used in the thermoforming head in FIGS. 4-7.

The latter, in the preferred embodiment shown and with reference also to FIG. 10, comprises a mold die 5240 that has a shape adapted to generate a container C of the preferred shape and dimensions. The free upper edges of the mold die 5240 advantageously comprise radial recesses 5249 into which the push points of the grippers 5201 can be inserted, so as to define an annulus of substantially uniform width, suitable for the axial gripping of the blank G during the drawing and blow-molding and in order to facilitate the operations of depositing the blank and picking up the container.

However, advantageously, also at the radial recesses 5249, the free upper edges of the mold die 5240 define an uninterrupted circumferential support annulus, sufficient for the axial gripping of the blank G during the drawing and blow-molding.

Preferably the mold 524 comprises a cooling system for cooling at least the perimeter walls of the die 5240, so as to facilitate the solidification of the material of the blank G during the drawing operation that generates the container C; in a preferred embodiment the cooling system comprises conduits for conveying a fluid around the wall of the die 5240.

In this regard, according to a preferred embodiment, the mold die 5240 is selectively removably coupled (e.g. by way of engagement with a grub screw) to a supporting bottom 5241 which is part of the mold 524 proper; this makes it possible to rapidly change the mold die 5240 if it is worn or if the shape of the containers C to be produced needs to be modified.

The supporting bottom 5241 and more generally the mold die 5240 can move on the column 525 in order to allow the alternating motion of the mold 524 from and toward the bell 521 in operation; to this end there is a mold cam-following roller 5245 which cooperates with a fixed cam (not shown) in order to produce the translation of the mold 524 along the column 525, at predetermined angular positions of the head 52 in its circular motion.

The mold 524 is, to this end, provided with a sleeve 5246 that embraces the column 525 so that it can slide.

Optionally, there is also a pneumatic tightening device which is adapted to force the upper free peripheral edges of the mold die 5240 into contact with the blank G against the bell 521.

The pneumatic tightening device in the preferred and illustrated embodiment comprises a variable-volume chamber 5247 in which a partition 5248, integral with the sleeve 5246, is hermetically accommodated; the variable-volume chamber 5247 is defined between an outer case fixed to the lower support ring 511 and the sleeve 5246 can be moved along the column 525 and coupled with the mold die 5240. The variable-volume chamber 5247 is also provided with an intake for supplying compressed air and with an outlet; preferably the compressed air that supplies the chamber 5247 passes through a dedicated passage defined in the column 525.

To describe the operation, a thermoforming head 52 in its continuous rotary motion about the axis H will be herein examined, ignoring the operation of the gripping device 520, which is already described above. The continuous rotation of the thermoforming carousel 51 about the central axis H can be obtained, for example, by way of a direct-drive motor on the central shaft of the carousel or a motor connected to such shaft by way of a transmission.

During such rotation, when the mold 524 is spaced apart from the bell assembly 521 (FIG. 4), the heated sheet-like blank G is positioned by the input star conveyor 81 in the thermoforming region, where it rests peripherally on the push points of the grippers 5201 which are in the closed position.

In this situation, the heated blank G can also rest on the upper free edges of the mold die 5240, or such mold die 5240 can be in a lowered position together with the mold 524 and be raised until it is brought to the height of the grippers 5201 so as to define, together therewith, a single, broader resting surface for the blank G.

Subsequently, moved by the respective mold cam-following rollers 5205 and 5245, the gripping device 520 and the mold 524 perform a translational motion vertically along the column 525 in the direction of the bell assembly 521, until (FIG. 5) the perimetric annulus of the blank G is engaged between the mold and the bell assembly, more precisely between the upper free peripheral edges of the mold die 5240 and the lower free peripheral edges of the bell 5211. Advantageously, the grippers 5201 can remain in the closed position in such situation, as in FIG. 5, so as to enlarge the lower resting surface of the heated blank G, or such grippers can remain open.

Subsequently (FIG. 6) the drawing device 522 is moved, performing a translational motion downward until it comes into contact and deforms, by drawing it, the blank G in order to make it take on an intermediate shape that substantially corresponds to the desired shape of the container C.

During the descent of the drawing device 522 or at its end (FIG. 6), compressed air under pressure is injected into the volume between the drawing device and the deformed blank, according to a conventional technique (for example between 3 and 6 bar); the compressed air is conveyed into the now-concave region of the deformed blank and deforms it further, pushing it into contact with the walls of the mold die 5240 in order to thus generate the desired shape of the container C. Given that the walls of the mold die are colder than the material of the container C, such material cools upon contact with it, hardening as it does so. Such effect is increased when the walls of the mold die 5240 are cooled, as described above. Thus the container C has been created.

At a later time (FIG. 7), after the depressurization of the chamber defined between the bell and the container C, the mold 524 is moved away again from the bell assembly 521 and is brought to a position that is spaced apart, where the space that is created between the mold 524 and the bell assembly 521 is at least sufficient for extracting the container C at the second region 53, by pulling it radially from the grippers 5201, conveniently open, by way of the output star conveyor 82.

Advantageously, the gripping device 520 is also lowered by way of the cam-following roller 5205 to a distance sufficient to separate the container C from the bell 521, thus further facilitating the extraction of the container from the grippers 5201 by the output star conveyor 82.

The disclosure, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102017000014650 (UA2017A000845) from which this application claims priority are incorporated herein by reference.

The invention claimed is:

1. A thermoforming station for thermoforming thermoplastic sheet-like blanks for a thermoforming line, the thermoforming station comprising: a thermoforming carousel configured to rotate continuously about a central axis and which comprises a plurality of thermoforming heads which are radially spaced apart from said central axis, each thermoforming head being adapted to receive at least one respective heated thermoplastic sheet-like blank at a first peripheral region which is outside the thermoforming carousel, so as to deform said sheet-like blank during the rotation of the thermoforming carousel in order to generate a container and release said container to a second peripheral region which is outside the thermoforming carousel and is angularly spaced apart from the first peripheral region, wherein each thermoforming head comprises a gripping device for gripping said sheet-like blank arriving from the first peripheral region, for positioning it at a thermoforming region and for releasing said container at said second peripheral region, said gripping device comprising grippers, each of said thermoforming heads being associated with a dedicated upright column which is fixed to a lower support ring of the thermoforming carousel and which vertically extends with its axis parallel to the central axis, wherein said gripping device can translate along said upright column.

2. The thermoforming station according to claim 1, wherein each thermoforming head comprises:
a bell thermoforming assembly equipped at least with a thermoforming drawing device and means for actuating the thermoforming drawing device, the latter being adapted to form a container by drawing the sheet-like blank;
a mold to allow the deformation of the sheet-like blank until it reaches a desired shape of the container, said mold being movable at least between a position in which it is arranged close to the bell thermoforming assembly and a position in which it is arranged away from the bell thermoforming assembly;
said upright column.

3. The thermoforming station according to claim 2, further comprising compressed air-blowing devices for blowing compressed air in order to plastically deform the sheet-like blank in a step of forming the container, said compressed air-blowing devices comprising at least one duct for conveying compressed air which is connected to a compressed air source.

4. The thermoforming station according to claim 1, wherein the gripping device comprises:
a guide sleeve configured to slide on the upright column, and a movement cam-following roller, which cooperates with a dedicated fixed cam in order to cause the vertical translation along the upright column of the gripping device;
said grippers for supporting the sheet-like blank, an actuation mechanism to which the grippers are articulated, and a gripper actuation cam-following roller, which in turn is functionally connected to the actuation mechanism and cooperates with a dedicated fixed cam in order to determine the opening and closing of the grippers.

5. The thermoforming station according to claim 2, wherein the bell thermoforming assembly is fixed with respect to the upright column and comprises a bell inside which said thermoforming drawing device is moved alternately, being moved by means for actuating the thermoforming drawing device.

6. The thermoforming station according to claim 5, wherein the means for actuating the thermoforming drawing device are pneumatic and comprise a pneumatic actuator which actuates a stem of the thermoforming drawing device in the direction of the mold and a return spring which works against said means for actuating the thermoforming drawing device and acts on the stem of the thermoforming drawing device in order to return it to a position which it is spaced apart from the mold.

7. The thermoforming station according to claim 2, wherein the mold is configured to move with respect to the upright column and comprises:
a mold die having a shape adapted to generate said container;
a mold cam-following roller, which cooperates with a dedicated fixed cam in order to cause an alternating movement of the mold along the upright column;
a sleeve which embraces the upright column so that it can slide; and
a pneumatic tightening device.

8. The thermoforming station according to claim 7, wherein the mold comprises a cooling system for cooling at least perimetric walls of the mold die.

9. A method of continuously thermoforming thermoplastic sheet-like blanks for forming containers, the method including the following steps:
- continuously rotating a thermoforming carousel about a central axis, said thermoforming carousel having a plurality of thermoforming heads which are radially spaced apart from said central axis,
- at a first peripheral region which is outside said thermoforming carousel, feeding heated thermoplastic sheet-like blanks to said thermoforming heads, so that each thermoforming head that passes through said first peripheral region receives a respective heated sheet-like blank, wherein said feeding step comprises gripping said respective heated blank by a respective gripping device of the respective thermoforming head, said gripping device comprising grippers,
- during said rotation, holding said sheet-like blanks in the respective thermoforming heads, vertically translating said gripping device along a dedicated upright column parallel to said central axis, fixed to a lower support ring of the thermoforming carousel and associated to each thermoforming head, and plastically deforming said sheet-like blanks until they are brought to the shape of a container, and
- releasing said containers by the grippers to a second peripheral region around the thermoforming carousel, which is angularly spaced apart from the first peripheral region with respect to said central axis.

* * * * *